United States Patent
Kuo et al.

(10) Patent No.: US 7,163,319 B2
(45) Date of Patent: Jan. 16, 2007

(54) BACKLIGHT MODULE

(75) Inventors: Chien-Hung Kuo, Wur Shiang (TW); Han-Chou Liu, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 78 days.

(21) Appl. No.: 11/151,842

(22) Filed: Jun. 14, 2005

(65) Prior Publication Data

US 2006/0158904 A1   Jul. 20, 2006

(30) Foreign Application Priority Data

Jan. 19, 2005   (TW) ............................ 94101521 A

(51) Int. Cl.
*F21V 7/00*      (2006.01)
*G02F 1/1333*   (2006.01)

(52) U.S. Cl. ........................ 362/306; 362/97; 362/29; 349/60

(58) Field of Classification Search ............... 362/632, 362/97, 29, 225, 306, 390; 349/56, 60, 64, 349/70, 161
See application file for complete search history.

(56) References Cited

U.S. PATENT DOCUMENTS 6,902,300 B1 * 6/2005 Lee ........................ 362/306
6,974,221 B1 * 12/2005 Wu et al. ................. 362/29
6,979,102 B1 * 12/2005 You .......................... 362/218
6,995,815 B1 * 2/2006 Tsai .......................... 349/70
7,059,736 B1 * 6/2006 Yu et al. ................... 362/97

FOREIGN PATENT DOCUMENTS

| | | |
|---|---|---|
| JP | 10-326517 | 12/1998 |
| TW | 592324 | 12/1991 |
| TW | 591300 | 6/1992 |

* cited by examiner

*Primary Examiner*—Ali Alavi
(74) *Attorney, Agent, or Firm*—Thomas, Kayden, Horstemeyer & Risley

(57) ABSTRACT

A backlight module comprises a reflector, an optical element, and a supporting structure. The supporting structure is disposed on the reflector and contacting the optical element for restricting the optical element from deformation. The supporting structure comprises a supporting portion and a cushion. The cushion is disposed between the supporting portion and the reflector. The cushion is an elastic element, providing a plurality of supporting forces in at least two directions, and enabling a tip of the supporting portion to move with the optical element.

20 Claims, 7 Drawing Sheets

BACKLIGHT MODULE

BACKGROUND

The invention relates to a backlight module, and more particularly to a backlight module utilized in large-size liquid crystal display.

In a large-size liquid crystal display (such as a liquid crystal TV), the size of optical elements such as diffuser and prism plate is larger. Thus, deformation of the optical elements due to temperature variation is increased and worsens the optical characteristics thereof. Conventionally, various supporting structures are disposed in backlight modules to reduce the deformation of optical elements.

FIG. 1a shows a backlight module 10 disclosed in JP Patent No. 10-326517, which comprises supporting elements 14 disposed between a reflector 11 and a diffuser 12 to reduce the deformation of the diffuser 12. In JP Patent No. 10-326517, however, a gap is formed between the diffuser 12 and a housing (not shown) of the backlight module in a direction parallel to a planar surface of diffuser 12. Therefore, during deformation (expanding and shrinking) of the diffuser 12 due to temperature variation, the diffuser 12 rubs supporting elements 14 in a direction (as shown by the arrow in FIG. 1a) parallel to the planar surface of diffuser 12 producing particles and noise.

FIG. 1b shows a backlight module 100 disclosed in Taiwan Patent No. 591300, which comprises supporting elements 120 disposed on a reflector 110 to reduce the deformation of diffuser 140. The structure of supporting element 120 is complicated and increases the manufacturing cost of the backlight module. Additionally, lamps 130 are disposed on the supporting element 120 and thickness of the backlight module is thus increased.

FIG. 2a shows a backlight module disclosed in Taiwan Patent No. 592324, which reduces the deformation of the diffuser 23 with a supporting element 241 and a spring 24. The spring 24, however, only provides supporting force in a single direction (perpendicular to a planar surface of the diffuser 23), which is less effective.

FIG. 2b shows another backlight module disclosed in Taiwan Patent No. 592324, which further comprises a restrictive element 214 to improve the support thereof. However, as JP Patent No. 10-326517, the diffuser 232 in FIG. 2b rubs the supporting element 241 and produces particles and noise. Additionally, the spring 24 increases manufacturing cost and thickness of the backlight module.

SUMMARY

The invention provides a backlight module. The backlight module comprises a reflector, an optical element, and a supporting structure. The supporting structure is disposed on the reflector and contacts the optical element to restrict deformation of the optical element. The supporting structure comprises a supporting portion and a cushion. The cushion is disposed between the supporting portion and the reflector. The cushion is an elastic element, provides a plurality of supporting forces in at least two directions, and enables a tip of the supporting portion to move with the optical element.

The tip of the supporting structure of the invention is moveable with the diffuser. Thus, particles and noise generated by rubbing between the supporting portion and the diffuser are avoided. The supporting structure of the invention is simpler and disposed between the lamps. The cost and thickness of the backlight module is therefore reduced. The invention further provides multidirectional supporting forces and more effective support.

BRIEF DESCRIPTION OF THE DRAWINGS

The invention will be more fully understood from the following detailed description and the accompanying drawings, given by the way of illustration only and thus not intended to limit the disclosure.

DETAILED DESCRIPTION

First Embodiment

Figure 1A:
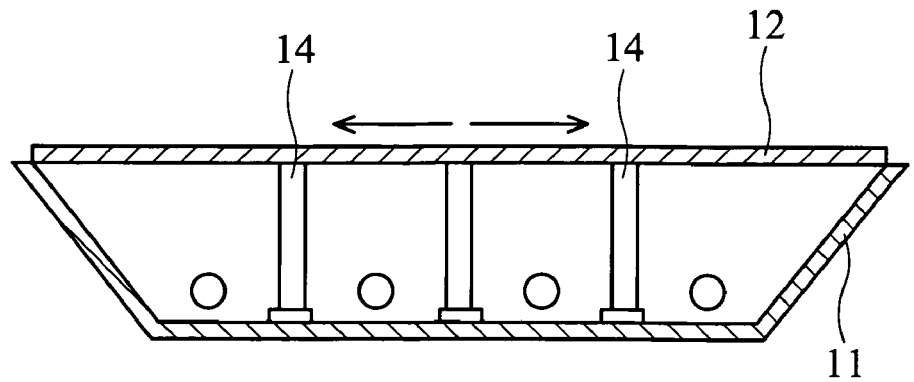
FIG. 1a shows a backlight module disclosed in JP Patent No. 10-326517.
Figure 1B:
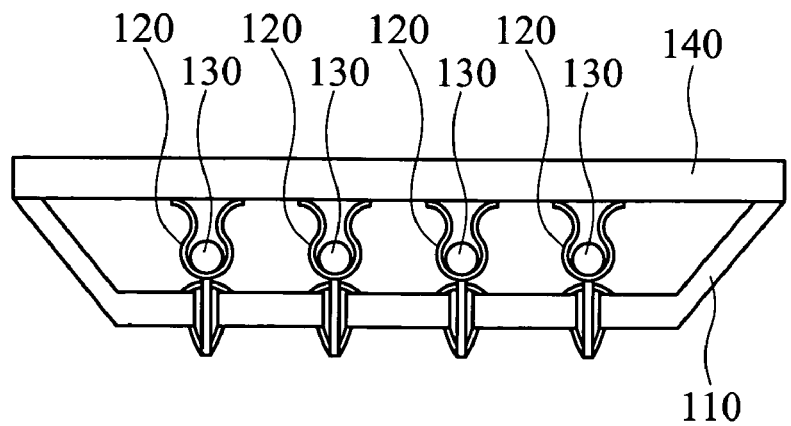
FIG. 1b shows a backlight module disclosed in Taiwan Patent No. 591300.
Figure 2A:
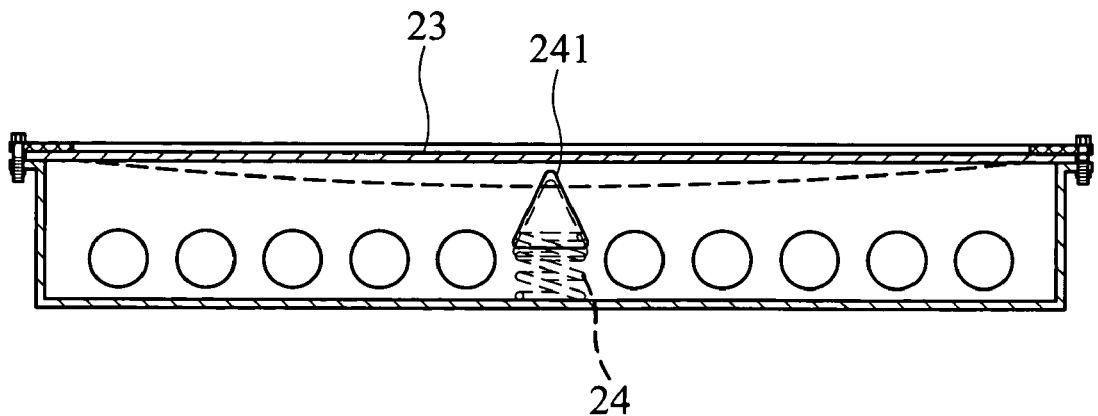
FIG. 2a shows a backlight module disclosed in Taiwan Patent No. 592324.
Figure 2B:
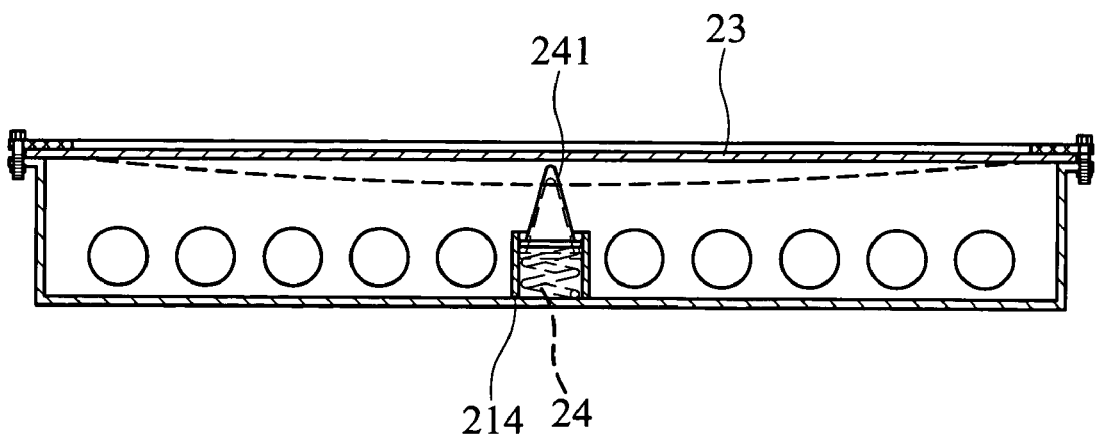
FIG. 2b shows another backlight module disclosed in Taiwan Patent No. 592324.
Figure 3A:
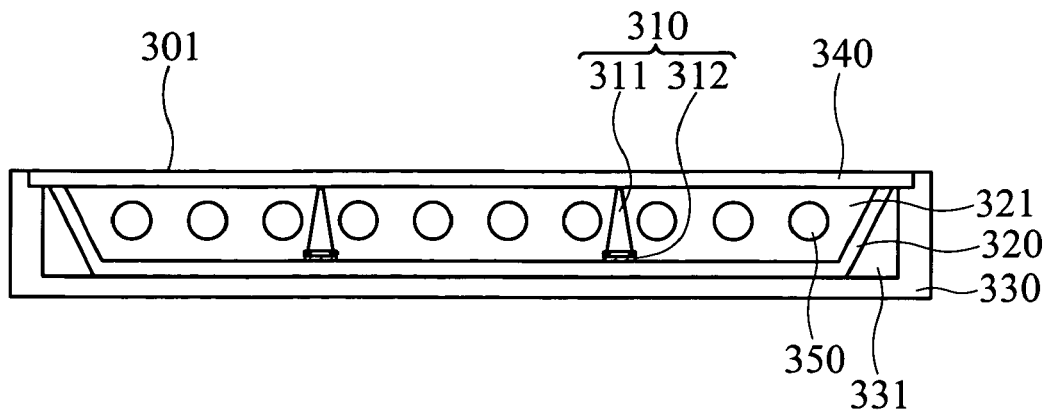
FIG. 3a shows a backlight module of the invention.

FIG. 3a shows a backlight module 300 of the invention, which comprises supporting structures 310, a reflector 320, a housing 330, a diffuser (optical element) 340 and lamps 350. A space 321 is formed between the reflector 320 and the diffuser 340. The lamps 350 and the supporting structures 310 are disposed in the space 321. The supporting structures 310 are located between the lamps 350. The reflector 320 is disposed in an inner space 331 of the housing 330. The diffuser 340 is disposed on the housing 330. The lamps 350 emit light toward a light emitting surface 301.

Figure 3B:
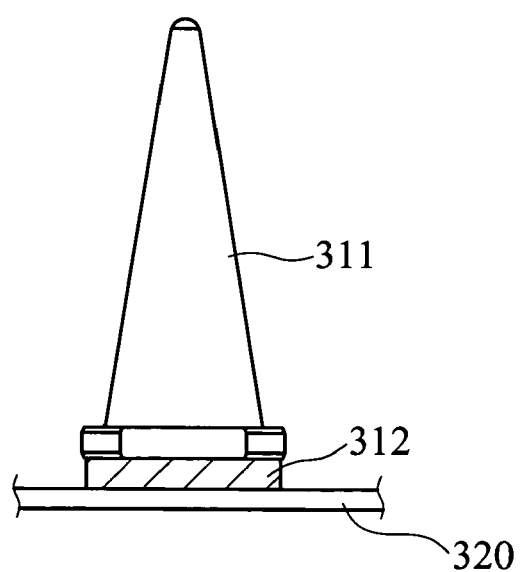
FIG. 3b shows a supporting structure of a first embodiment of the invention.

FIG. 3b shows the supporting structure 310 of the first embodiment of the invention. The supporting structure 310 comprises a supporting portion 311 and a cushion 312. The supporting portion 311 is cone-shaped and made of plastic. The cushion 312 is a uniformly elastic block made of polyurethane, silicon or rubber. The supporting portion 311 and the cushion 312 are white or transparent to prevent a black band from being displayed. The cushion 312 is adhered between the supporting portion 311 and the reflector 320.

Figure 4A:
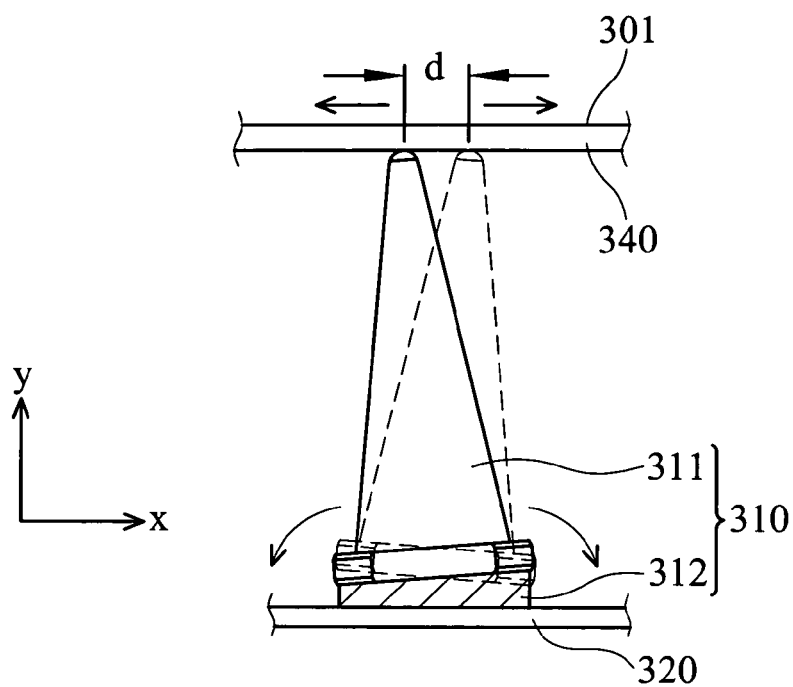
FIG. 4a shows a tip of the supporting structure moving with a diffuser.

With reference to FIG. 4a, when the diffuser 340 moves in a direction parallel the light emitting surface 301, the tip of the supporting portion 311 moves a predetermined distance d with the diffuser 340. Thus, particles and noise generated by rubbing between the supporting portion 311 and the diffuser 340 are avoided.

Figure 4B:
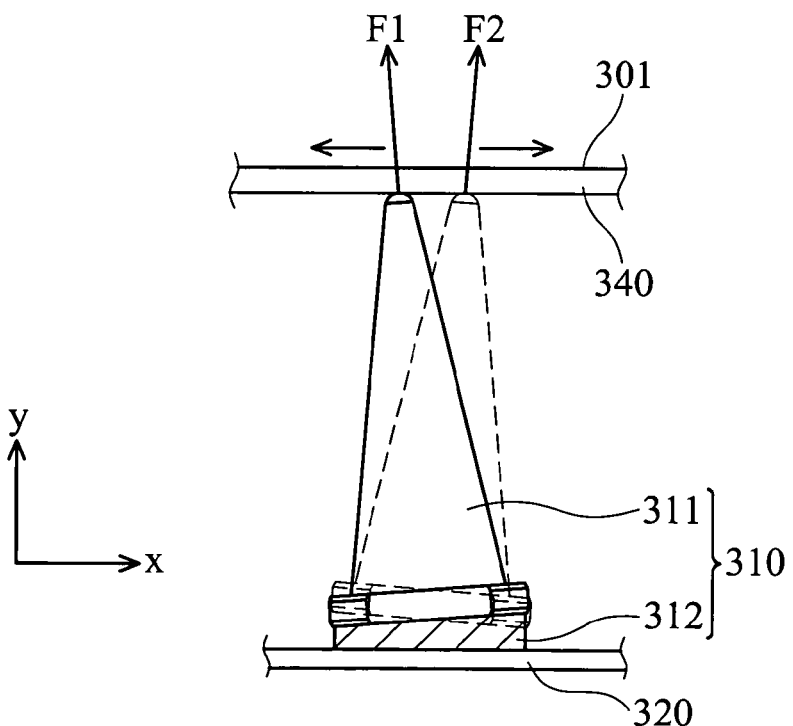
FIG. 4b shows the supporting structure supporting the diffuser in different orientations.
Figure 4C:
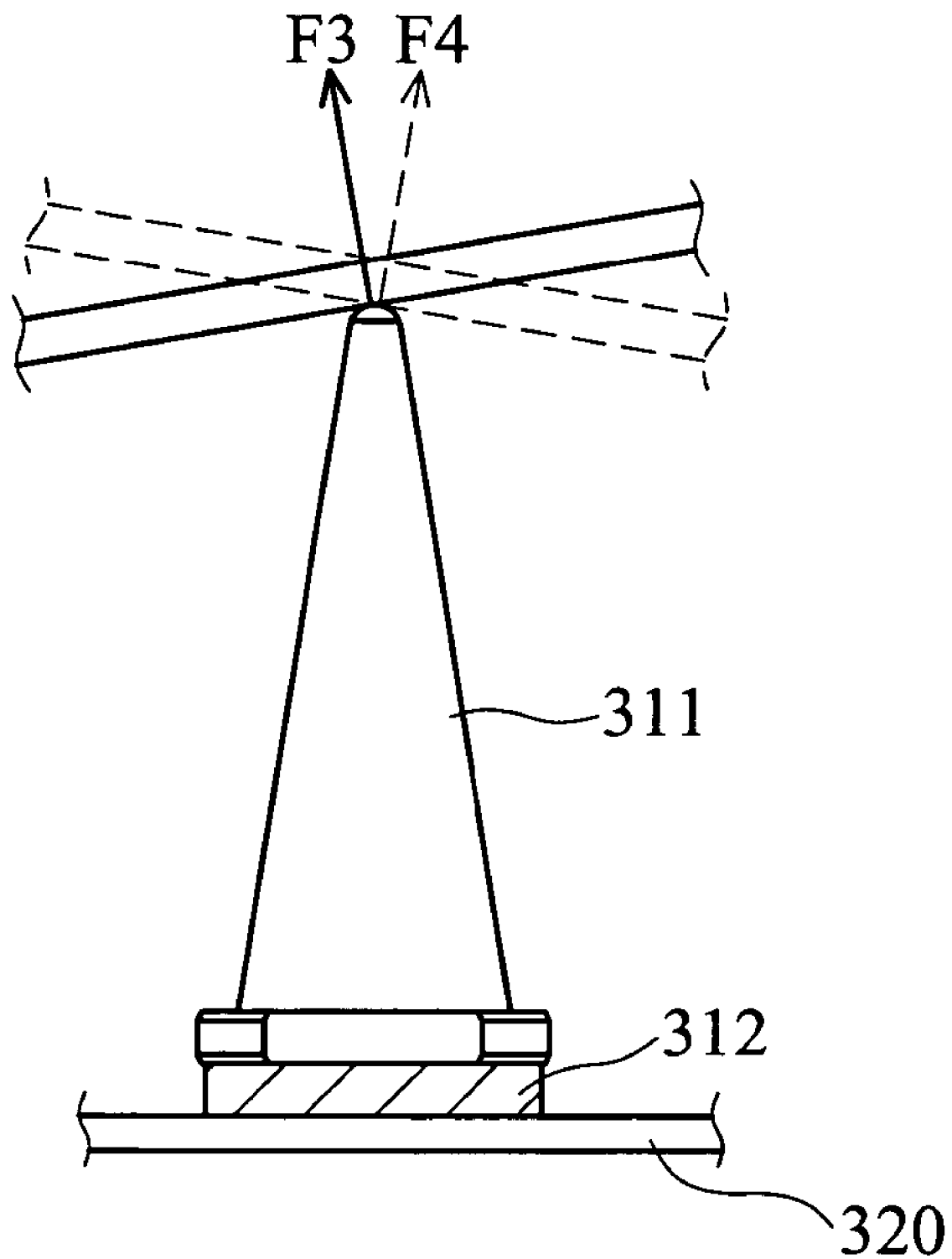
FIG. 4c shows the supporting structure supporting the diffuser when the diffuser curves.

With reference to FIG. 4b, the cushion 312 provides a first supporting force in a first direction y perpendicular to the light emitting surface 301 and a second supporting force in a second direction x parallel to the light emitting surface 301. Thus, the cushion 312 provides sufficient supporting forces (such as a supporting force F1 or a supporting force F2) on the supporting portion 311 to reduce the deformation of the diffuser 340; regardless of whether the supporting portion 311 stands vertically or obliquely. Additionally, as shown in FIG. 4c, the cushion 312 provides supporting force (such as a supporting force F3 or a supporting force F4) corresponding to differing directional deformations of the diffuser 340. Thus, the invention provides more effective support.

Figure 5A:
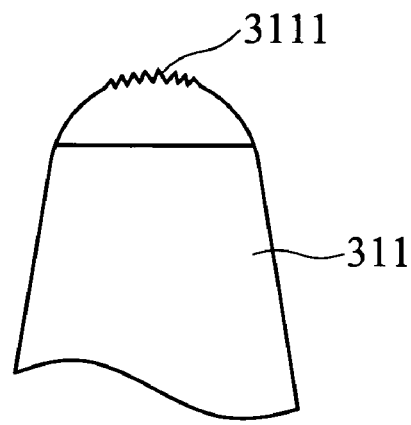
FIG. 5a shows a rough surface formed on the tip of the supporting structure.
Figure 5B:
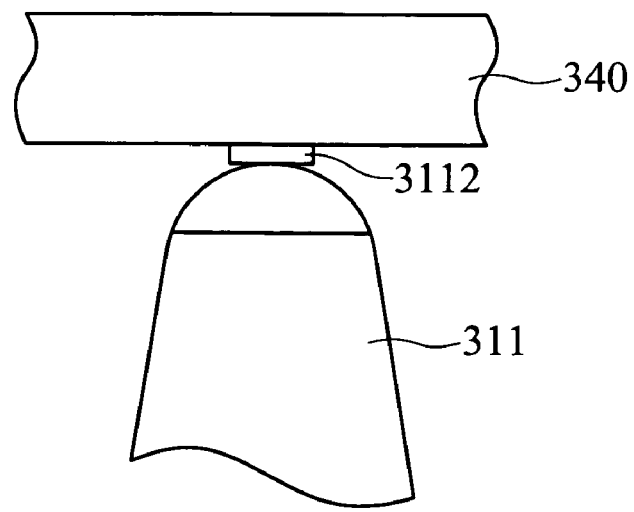
FIG. 5b shows an adhesive material disposed on the tip of the supporting structure.

The supporting portion 311 is made of materials with increased friction coefficient, such as transparent rubber, to increase friction between the supporting portion 311 and the diffuser 340. As shown in FIG. 5a, the tip of the supporting portion 311 can further comprise a rough surface 3111, or, as shown in FIG. 5b, an adhesive material 3112 (such as a twin adhesive) to increase friction between the supporting portion 311 and the diffuser 340.

Second Embodiment

Figure 6:
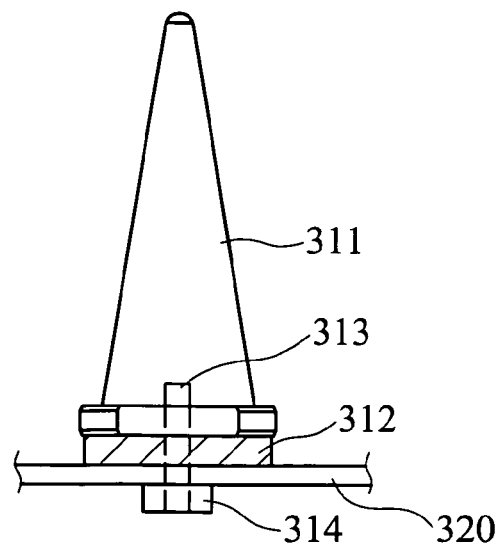
FIG. 6 shows a supporting structure of a second embodiment of the invention.

FIG. 6 shows a supporting structure 410 of a second embodiment of the invention. The supporting structure 410 further comprises a bolt 313 (fixing element) passing the reflector 320 and fixed on a back side of the reflector 320 by a nut 314. The bolt 313 increases the supporting force of the supporting structure 410, wherein the bolt 313 is inserted to a shallow depth in the supporting portion 311, and the tip of the supporting portion 311 is still moveable by a predetermined distance.

Third Embodiment

Figure 7:
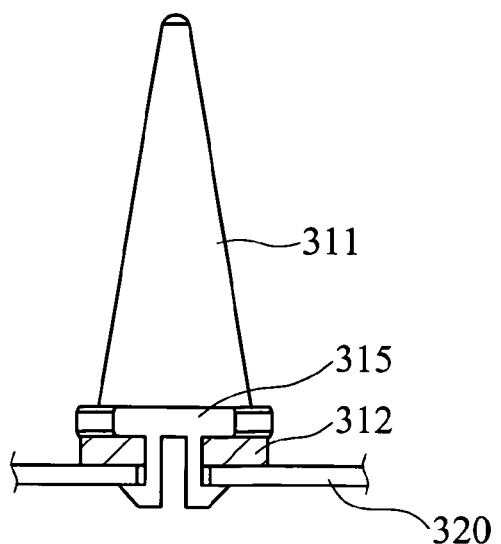
FIG. 7 shows a supporting structure of a third embodiment of the invention.

FIG. 7 shows a supporting structure 510 of a third embodiment of the invention. The supporting structure 510 further comprises a fixing element 313 passing and abutting the reflector 320 by elastic force. The fixing element 313 comprises a lever having a hook at the tip end thereof. The fixing element 313 increases the supporting force of the supporting structure 510.

The tip of the supporting structure of the invention is moveable with the diffuser. Thus, particles and noise generated by rubbing between the supporting portion and the diffuser are avoided. The supporting structure of the invention is simpler and disposed between the lamps. The cost and thickness of the backlight module is therefore reduced. The invention further provides multidirectional supporting forces and more effective supporting.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module, comprising:
   a reflector;
   an optical element; and
   a supporting structure disposed on the reflector and contacting the optical element, wherein the supporting structure comprises a supporting portion and a cushion, the cushion being disposed between the supporting portion and the reflector,
   wherein the cushion provides a plurality of supporting forces in at least two directions and enables a tip of the supporting portion to move with the optical element.

2. The backlight module as claimed in claim 1, wherein the cushion is an elastic element.

3. The backlight module as claimed in claim 2, wherein the cushion is a uniformly elastic block.

4. The backlight module as claimed in claim 2, wherein the cushion is substantially made from polyurethane, silicon or rubber.

5. The backlight module as claimed in claim 1, wherein the supporting forces comprise a first supporting force perpendicular to a light emitting surface of the backlight module.

6. The backlight module as claimed in claim 1, wherein the supporting forces comprise a second supporting force parallel to a light emitting surface of the backlight module.

7. The backlight module as claimed in claim 1, wherein the cushion applies the supporting forces on the supporting portion.

8. The backlight module as claimed in claim 1, wherein the cushion is white or transparent.

9. The backlight module as claimed in claim 1, wherein the supporting portion is substantially made from plastic.

10. The back-light module as claimed in claim 1, wherein the supporting portion is substantially made from transparent rubber.

11. The backlight module as claimed in claim 1, wherein a rough surface is formed on the tip of the supporting portion.

12. The backlight module as claimed in claim 1, further comprising an adhesive material disposed between the supporting portion and the optical element.

13. The backlight module as claimed in claim 1, wherein the supporting portion is white or transparent.

14. The backlight module as claimed in claim 1, wherein the supporting portion is cone-shaped.

15. The backlight module as claimed in claim 1, wherein the supporting structure is adhered on the reflector.

16. The backlight module as claimed in claim 1, wherein the supporting structure further comprises a fixing element disposed in the supporting portion, passing the cushion and fixing the supporting structure on the reflector.

17. The backlight module as claimed in claim 16, wherein the fixing element is a bolt.

18. The backlight module as claimed in claim 16, wherein the fixing element comprises a lever having a hook at the tip end thereof.

19. The backlight module as claimed in claim 1, further comprising at least two lamps disposed between the optical element and the reflector, wherein the supporting structure is disposed between the lamps.

20. The backlight module as claimed in claim 1, wherein the optical element is a diffuser.

* * * * *